United States Patent [19]

Green

[11] Patent Number: 5,017,389

[45] Date of Patent: May 21, 1991

[54] NUTRITIONAL DRINK COMPOSITIONS

[76] Inventor: Scott T. Green, 760 E. Main St., Frankfort, Ky. 40601

[21] Appl. No.: 325,059

[22] Filed: Mar. 13, 1989

Related U.S. Application Data

[63] Continuation-in-part of Ser. No. 232,809, Aug. 16, 1988, abandoned.

[51] Int. Cl.$^5$ ................................................. A23K 1/00
[52] U.S. Cl. ........................................ 426/72; 426/74; 426/590; 426/656; 426/658; 426/805
[58] Field of Search .................... 426/74, 72, 590, 805, 426/800, 656, 658

[56] References Cited

U.S. PATENT DOCUMENTS

| | | | |
|---|---|---|---|
| 2,895,830 | 7/1959 | Roe | 426/590 |
| 3,185,572 | 5/1965 | Motzel | 426/74 |
| 3,219,454 | 11/1965 | Howard et al. | |
| 3,936,527 | 2/1976 | Alper | 424/177 |
| 4,042,684 | 8/1977 | Kahm | 426/590 |
| 4,070,488 | 1/1978 | Davis | |
| 4,298,601 | 11/1981 | Howard | |
| 4,309,417 | 1/1982 | Staples | |
| 4,312,856 | 1/1982 | Korduner | 426/590 |
| 4,325,975 | 4/1982 | Lindon et al. | 426/74 |
| 4,414,238 | 11/1983 | Schmidl | 426/74 X |
| 4,497,800 | 2/1985 | Larson et al. | 426/74 |
| 4,600,586 | 7/1986 | Green | 426/72 |

*Primary Examiner*—R. B. Penland
*Attorney, Agent, or Firm*—King & Schickli

[57] ABSTRACT

A nutritional drink composition formulated for dogs and other animals includes various compounds including water, dextrose, glycine, electrolytes (including sodium potassium and chlorine), sodium carbonate and other vitamin and mineral supplements.

5 Claims, No Drawings

NUTRITIONAL DRINK COMPOSITIONS

This is a continuation-in-part of application ser. No. 232,809, filed on August 16, 1988, now abandoned.

TECHNICAL FIELD

The present invention relates to the field of animal nutrition and, more particularly, to a nutritional drink composition for animals such as hunting dogs.

BACKGROUND OF THE INVENTION

Individual animals vary greatly in their nutritional needs depending upon such factors as age, weight, sex and the extent of their exercise or work. Young animals may require twice the nutrients of adult animals. For example, puppies increase their whelping weight by approximately 60 times during their first year of life. In order to do this, they require especially high amounts of protein and vitamins. In contrast, older animals require approximately ⅓ less nutrients. Older animals have low protein requirements but they do, however, have an increased demand for vitamins and minerals in order to maintain the proper function of their bodily systems.

Animals in gestation may require up to 20% more nutrients than their own maintenance requirements. These nutrients are rapidly utilized by the developing young in the uterus. After parturition, the lactating animal may require two to three times her maintenance intake in order to produce the necessary colostrum and milk to nourish the newborn young.

The environment the animal is living in can also greatly affect its nutritional requirements. For example, a cold-acclimated dog has an increased oxygen demand and metabolic rate. Such a dog may require 70%-90% more calories than a dog in a milder climate or a dog maintained indoors.

Working dogs, such as hunting dogs and racing greyhounds also have increased oxygen consumption rates that may be as much as eight times greater than a dog at rest. A working dog may require as much as four times as many calories per day as would otherwise be required for maintenance in order to produce the necessary energy to complete the work. Of course, when working, water is also consumed by the animal at a greater rate. Thus, working dogs must have access to water frequently during the day if their efficiency and endurance is to be maintained. If a working dog does not receive the proper nutritional needs, it may begin to suffer within as short a time period as an hour or two from hypoglycemia and in more severe conditions even convulsions and ataxia.

In contrast to the varying nutritional needs of animals as described above, animal feed is typically designed to meet the nutritional requirements of an average animal. Of course, an individual animal's nutritional needs may vary widely from that of the average animal and, therefore, the level of nutrition provided by the animal feed. Thus, a need clearly exists for a product that supplements the nutrition provided by animal feed. Preferably, this product should not only be healthful, but also refreshing and palatable for the animal. It should also be relatively inexpensive and easy to use.

SUMMARY OF THE INVENTION

It is, accordingly, one object of the present invention to provide a nutritional drink composition for utilization in supplementing the diet of animals in order to meet their individual needs.

A further object of the present invention is to provide a nutritional drink composition providing quick energy and protein, as well as vitamins and minerals necessary for proper operation of the animals various bodily systems.

Still another object of the invention is to provide a nutritional drink composition for strengthening teeth and freshening the breath of the animal.

Other objects and advantages of the present invention will become apparent as the description thereof proceeds.

In satisfaction of the foregoing objects and advantages, there is provided by this invention nutritional drink compositions comprising water as the main ingredient. Preferably, the compositions include approximately 90-98 weight percent water. The compositions also include from approximately 1-5 weight percent carbohydrates. Preferably, the carbohydrates are in the form of dextrose which can directly enter into the bloodstream without digestion and, therefore, provide a source of quick energy.

The compositions also include from approximately 0.2-1.0 weight percent protein. In this way the animal is provided with a source of amino acids in order to maintain the proper functions of the body. In addition, the compositions include from approximately 0.2-1.75 weight percent electrolytes. Preferably, the electrolytes are in the form of sodium chloride and potassium chloride although potassium citrite may also be utilized. Sodium, chlorine and potassium are all essential elements to the animal's fluid regulating mechanism. Together they serve to maintain the balance and movement of fluids through the cell walls of the body.

Additionally, the nutritional drink compositions may include a buffer. Preferably, the buffer is utilized to maintain a neutral pH of substantially 7. Thus, the drink composition also serves to offset acidosis in animals suffering from that condition.

The nutritional drink compositions may include a vitamin and mineral supplement. Vitamins provided in the supplement include thiamin, riboflavin, niacin, pyridoxine (also known as vitamin B-6), pantothinic acid and cyanocobalamin (also known as vitamin B-12). Minerals included in the supplement include iodine, iron and copper. The vitamin and mineral supplement aids in a number of biological processes including, particularly, blood regeneration. The nutritional drink composition could also include approximately 0.05 weight percent sodium fluoride to aid in the development and maintenance of strong teeth. In addition, taurine could be provided in weight percentages between 0.025 and 0.5. Taurine is an essential amino acid for cats which cannot be converted from other protein sources. If proper amounts of taurine are not maintained, cardiomyopathy could result.

Finally the nutritional drink composition may include an agent for freshening the breath of the animal. Such an agent may be selected from any known breath freshener including, but not limited to chlorohexidine, thymol and cetylpyridinium chloride.

DETAILED DESCRIPTION OF THE INVENTION

As indicated above, the present invention is drawn to novel, nutritional drink compositions containing a number of beneficial ingredients required by animals and particularly animals being subjected to stress in one form or another. As provided, the nutritional drink compositions comprise by percentage of total weight, substantially 90-98% water, 1.0-5.0% carbohydrate, 0.2-1.0% protein, 0.2-1.75% electrolytes, 0-0.15% buffer and 0-0.05% vitamin and mineral supplement. Advantageously, such compositions have a relatively long shelf life even without the utilization of preservatives.

More specifically, water is an essential ingredient that is absolutely required for an animal's survival. While working animals and particularly those in relatively hot, humid climates may require greater amounts of water, all animals require at least a minimum amount each day to replace that which is lost from the body.

The compositions include a carbohydrate since carbohydrates play an important role in animal nutrition as not only a protein sparing nutrient, but also a ready source of energy. Carbohydrates also serve to maintain blood glucose levels. Animals can efficiently utilize large amounts of carbohydrates.

Preferably, dextrose is the carbohydrate that is utilized in the present composition. Dextrose is not as sweet as either fructose or glucose and, as such, the drink composition is quite palatable to substantially all animals without the addition of any artificial flavorings. Dextrose also dissolves easily in water. Further, because it is a simple sugar, it does not need to be digested before utilization by the animal. Thus, dextrose represents a source of quick energy. This last factor is particularly important where the animal is being subjected to high stress levels. Such stress levels are often encountered by hunting and herding dogs, particularly during excessively hot and humid summer months. These stress levels are also suffered by dogs and other types of animals recovering from injuries and/or surgical procedures.

The protein provided in the nutritional drink composition is preferably glycine although other sources of protein could be utilized. Glycine not only provides amino acids essential to the survival of the animal, but it also advantageously acts to increase sodium and water absorption from the intestines. Increased absorption of these materials serves to increase the efficiency and endurance of the animal during extended periods of stress.

The drink compositions also include sodium, potassium chloride and/or potassium citrate as a source of electrolyte replacement. When an animal is sick and suffering from vomiting and/or diarrhea, or when an animal suffers from prolonged dehydration, potassium, sodium and chloride leave the cellular fluid and escape from the body in large amounts. These materials must be replaced in order to maintain the balance and movement of fluids through the cell walls of the body that are required for survival.

Still more importantly, it should be recognized that potassium is also a vital element required for proper metabolism of body tissues. Potassium deficiencies often occur in aging dogs and dogs suffering renal disease. In certain instances, potassium deficiency may produce irreversible pyelonephritis. Further, unless potassium levels are restored to an animal, the body's defense mechanism against infection is weakened. Thus, the provision of potassium to an animal is particularly valuable.

Both sodium and chlorine are essential for normal physiological performance. Sodium deficiencies can be caused by a loss of body fluids due to hot weather and also certain illnesses. Sodium deficiencies are manifested in muscular cramps, weakness, dryness of the skin, reduced appetite, growth retardation, alopecia, and in severe cases, collapse of the vascular system, severe skin lesions and sometimes death. Thus, it is clear that the addition of sodium and chlorine to the diet of an animal is also beneficial.

In certain instances it may also be desired to provide the nutritional drink composition with a buffer. Preferably, the buffer is in the form of sodium bicarbonate although, other slightly alkaline buffers or even citric acid could be utilized. Advantageously, by providing the nutritional drink with a neutral pH of substantially seven, it is more readily absorbed in the intestines. This neutral pH also serves to offset the effects of acidosis which is an abnormal state of reduced alkalinity of the blood and the body tissues.

The composition may also include a vitamin and mineral supplement. Preferably, this vitamin and mineral supplement includes compounds selected from a group including peptonized iron, copper, cyanocobalamin, thiamin, riboflavin, niacinamide, pyridoxine hydrochloride, liver fraction, iodine and any mixtures thereof.

The peptonized iron, copper and cyanocobalamin (vitamin B-12) are provided primarily for utilization by the animal in blood regeneration.

Thiamin or vitamin B-1 is required by the animal for carbohydrate and amino acid metabolism. Hunting dogs and those maintained in cold climates need two or three times the normal daily requirements of thiamin to withstand the stress to which they are subjected. It is particularly important that animals receive thiamin in their diets since deficiencies can lead to anorexia, constipation, weight loss, weakness, drowsiness, convulsions and other circulatory and respiratory disturbances.

Riboflavin or vitamin B-2 is essential for growth and the maintenance of healthy skin. In early gestation, it is essential to maintain minimum levels of riboflavin in order to prevent birth defects. If riboflavin deficiency is not avoided, it can manifest itself in a number of serious ways. Chronic deficiency produces dry, flaky skin, hind leg weakness, conjunctivitis, vascularization of the cornea, anemia and tachycardia. Acute riboflavin deficiency may lead to sudden collapse accompanied by a fall in body temperature, a variable heart rate and a low respiratory rate. Coma and death follow within a few hours.

Niacinamide is provided in the vitamin and mineral supplement in order to furnish a ready source of niacin. Niacin functions with folic acid and is essential for the formation of red blood cells.

Pyridoxine hydrochloride is provided in the supplement so as to provide a ready source of pyridoxine or vitamin B-6. vitamin B-6 is essential for the metabolism of fats and proteins and is required in the diet of all animals. Vitamin B-6 deficiencies in dogs can quickly cause a severe microcytic hypochromic anemia.

Finally, iodine is provided in the supplement so as to help prevent goiter. Dogs suffering from iodine deficiency show poor hair coats, anemia and infertility. Such ailments are avoided through iodine supplementation in the manner of the nutritional drink composition of the present invention.

The nutritional drink composition may also include a tooth strengthening agent. For example, the composition may include approximately 0.01 to 0.1 weight percent sodium fluoride to aid in the development of strong teeth in young animals. In older animals, such a sodium fluoride supplement helps resist tooth decay.

Where the nutritional drink composition is specifically directed for consumption by cats, the composition may include approximately 0.025 to 0.5 weight percent taurine. Such a taurine supplement helps prevent cardiomyopathy that might otherwise result due to insufficient levels of this amino acid in the animal. Finally, the nutritional drink composition may include a breath freshening agent. Any known breath freshening agent that may be safely consumed in relatively small quantities may be utilized. Preferably, the composition includes approximately 0.01 to 0.25 weight percent breath freshening agent. Examples of such an agent include chlorohexidine, thymol and cetylpyridinium chloride and any mixtures thereof.

From the above, it should be appreciated that when the nutritional drink composition of the present invention includes the vitamin and mineral supplement described, the composition may also be utilized to aid in the treatment of various ailments and diseases of the animal. These include anorexia, anemias, exposure, hypoglycemia, liver diseases, pancreatitis, renal disease and urolythiasis.

The following examples are presented to further illustrate the invention, but it is not to be considered as limited thereto.

EXAMPLE 1

25.0 gms of dextrose, 5.0 gms of glycine, 3.75 gms of sodium chloride, 2.5 gms of potassium chloride and 0.7 gms of sodium bicarbonate were added to one liter of water and mixed by agitation until completely dissolved.

EXAMPLE 2

25.0 gms. of dextrose, 5.0 gms of glycine, 3.75 gms of sodium chloride, 2.5 gms of potassium chloride and 0.7 gms of sodium bicarbonate were added to one liter of water and mixed by agitation until completely dissolved. Two ml of a vitamin and mineral mixture known as Lixotinic liquid and available from Beecham Laboratories of Bristol, TN, was then added to the solution.

EXAMPLE 3

25.0 gms of dextrose, 5.0 gms of glycine, 3.75 gms of sodium chloride, 2.5 gms of potassium citrate, 0.7 gms of citric acid and 0.7 gms of chlorohexidine are added to one liter of water and mixed by agitation until completely dissolved.

EXAMPLE 4

25.0 gms of dextrose, 5.0 gms of glycine, 3.75 gms of sodium chloride, 2.0 gms of potassium citrate, 0.7 gms of sodium bicarbonate, 0.7 gms of chlorohexidine and 0.23 gms of sodium fluoride are added to one liter of water and mixed by agitation until completely dissolved. Two ml of the vitamins and mineral supplement identified in Example 2 is then added to the solution.

EXAMPLE 5

2.0 gms of taurine is added to the composition of Example 1 and then thoroughly mixed.

Four ounces of any of the drink compositions made in Examples 1-5 per 30 pounds of body weight is then provided to the animal on a daily basis. The amount may, of course, be varied depending on particular needs of an individual animal or the desires of the pet owner or veterinarian. The drink composition serves as a quick source of high energy and replaces lost body fluids.

In summary, numerous benefits have been described which result from employing the concepts of the present invention. The invention has been described herein with reference to a certain preferred composition embodiment. However, as obvious variations thereon will become apparent to those skilled in the art, the invention is not to be considered as limited thereto.

I claim:

1. A nutritional drink composition for dogs and for cats, consisting essentially of
    by percentage of total weight, substantially
    90-98% water;
    1.0-5.0% dextrose;
    0.1-1.0% glycine;
    0.1-1.0% sodium choloride;
    0.1-0.75% electrolyte selected from a group consisting of potassium citrate, potassium chloride and any mixtures thereof;
    0.01-0.1% of sodium fluoride as a tooth strengthening agent;
    0-0.15% buffer selected from a group consisting of citric acid and sodium bicarbonate;
    0-0.05% vitamin and mineral supplement;
    0.01-0.25% breath freshening agent and said composition having a pH of substantially 7.

2. The nutritional drink composition set forth in claim 1, wherein said vitamin and mineral supplement includes compounds selected from a group including peptonized iron, copper, cyanocobalamin, thiamin; riboflavin, niacinamide, pyridoxine hydrochloride, liver fraction, iodine and any mixtures thereof.

3. The nutritional drink composition set forth in claim 1, wherein said vitamin and mineral supplement includes by percentage of total weight;
    60-65% liver fraction;
    30-35% peptonized iron;
    3.0-4.0% niacinamide;
    0.5-1.0 thiamin;
    0.25-0.55 pyridoxine hydrochloride;
    0.25-0.5 riboflavin;
    0-0.25 iodine;
    0-0.1 copper; and
    0-0.1 cyanocobalamin.

4. The nutritional drink composition set forth in claim 1, wherein said breath freshening agent is selected from a group consisting of chlorohexidine, thymol, cetylpyridinium chloride and any mixtures thereof.

5. The nutritional drink composition set forth in claim 1, further including 0.025-0.5% taurine.

* * * * *